Feb. 26, 1952     L. A. MARQUARDT ET AL     2,586,969
HAND BRAKE FOR RAILWAY CARS

Filed Oct. 26, 1950     3 Sheets-Sheet 2

Inventors.
Leonard A. Marquardt.
Charles E. Gorton
By Henry Fuchs
Atty.

Feb. 26, 1952 — L. A. MARQUARDT ET AL — 2,586,969
HAND BRAKE FOR RAILWAY CARS
Filed Oct. 26, 1950 — 3 Sheets-Sheet 3
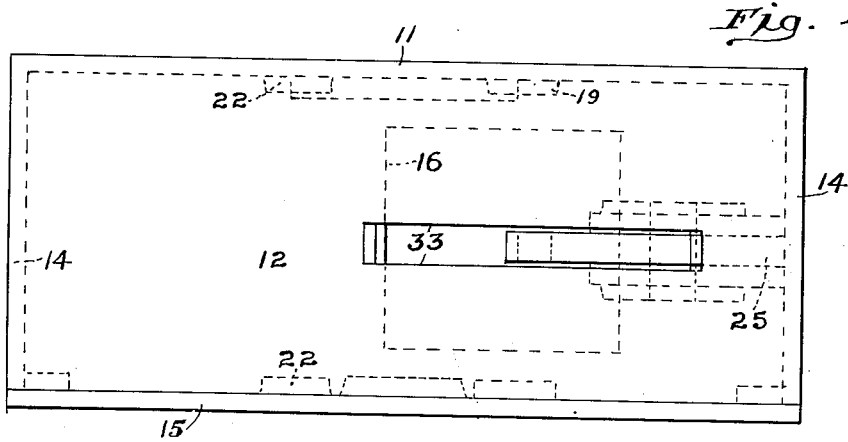
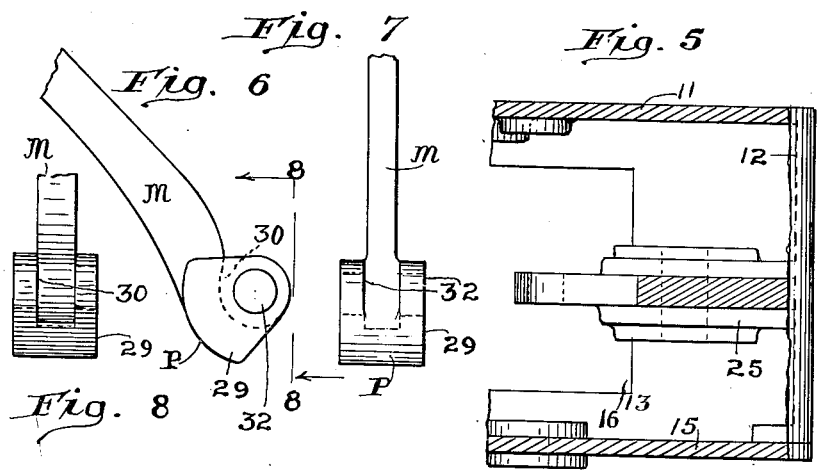
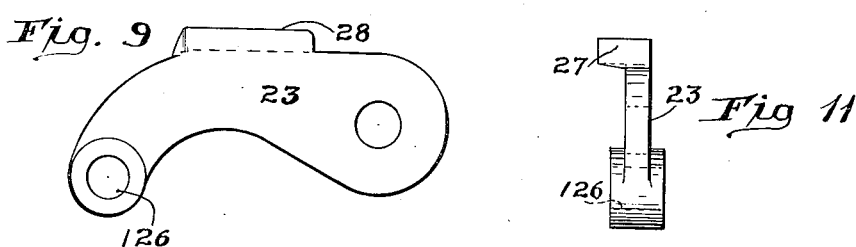
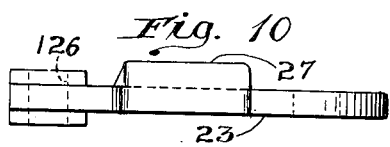
Inventor:
Leonard A. Marquardt.
Charles E. Gorton.
Henry Fuchs
Atty.

Patented Feb. 26, 1952

2,586,969

UNITED STATES PATENT OFFICE 2,586,969

HAND BRAKE FOR RAILWAY CARS

Leonard A. Marquardt, Elmhurst, and Charles E. Gorton, Chicago, Ill., assignors to W. H. Miner, Inc., Chicago, Ill., a corporation of Delaware Application October 26, 1950, Serial No. 192,264

11 Claims. (Cl. 74—505)

This invention relates to improvements in hand brakes.

One object of the invention is to provide a hand brake mechanism of the power multiplying, gear driven, chain winding drum type, especially adapted for use in connection with railway cars, wherein quick release of the brake mechanism is obtained with free running of the chain winding drum, by separation of the cooperating gear members.

A further object of the invention is to provide a mechanism of the character described in the preceding paragraph, wherein the cooperating members of the gear driven mechanism include a pinion rotated by the usual hand wheel, a second pinion having operative connection with the drum for rotating the same, and an intermediate pinion member mounted on a manually controlled shiftable carrier and engageable with and disengageable from said first and second named pinions to respectively establish driving relation between the hand wheel and drum and to break the connection between these parts when desired to effect quick release of the brakes.

A still further object of the invention is to provide a mechanism as hereinbefore set forth, wherein a ratcheting action of the brake mechanism is provided by a spring pressed pawl mounted on the carrier and cooperating with ratchet means operatively connected with the intermediate pinion of the gear driven mechanism.

Other objects of the invention will more clearly appear from the description and claims hereinafter following.

Figure 1:
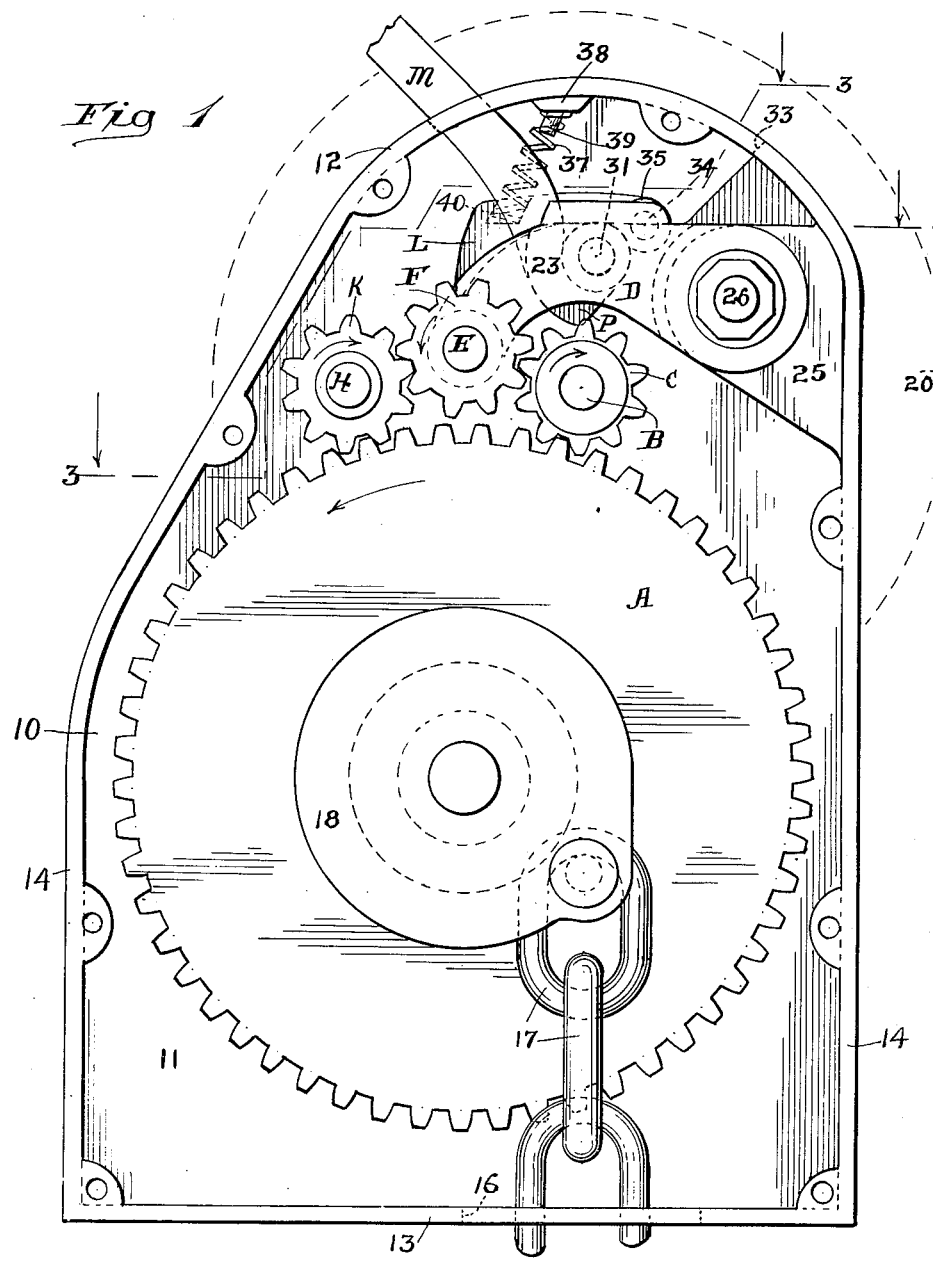
Figure 2:
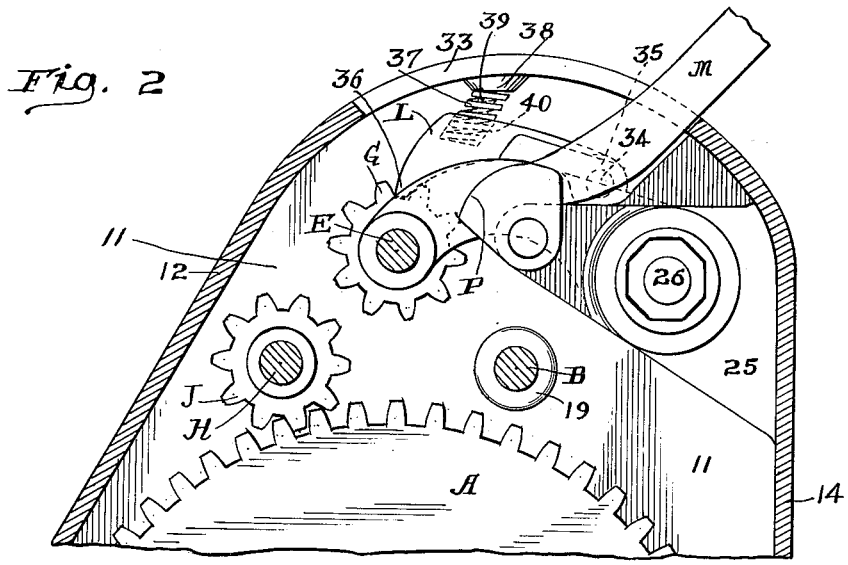
Figure 3:
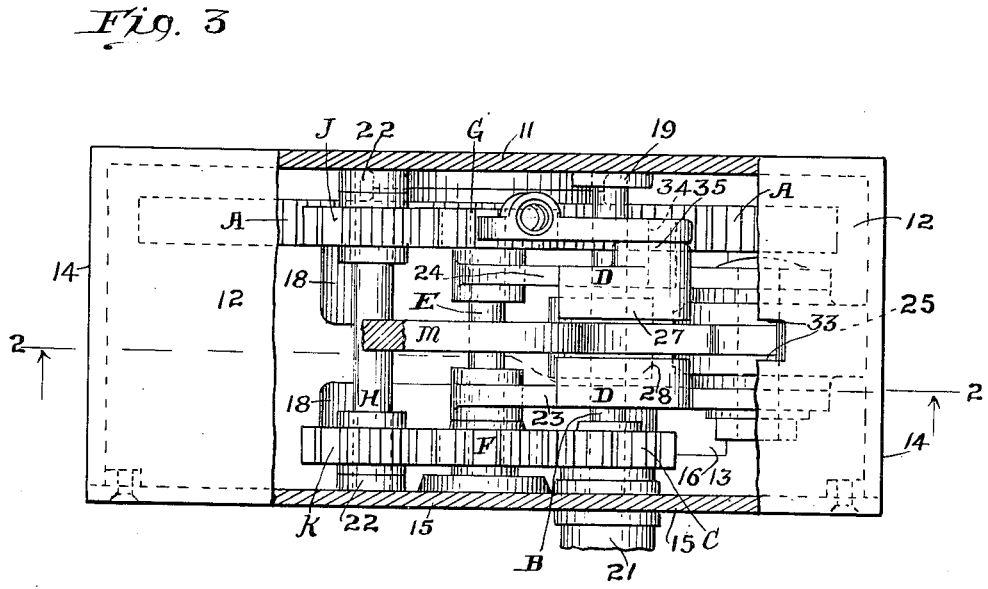
Figure 12:
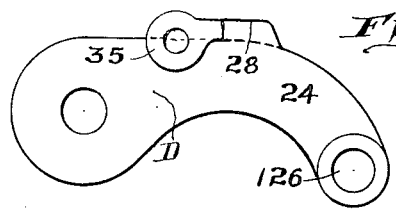

In the accompanying drawings forming a part of this specification, Figure 1 is a front elevational view of our improved brake mechanism with the cover plate of the enclosing brake housing removed. Figure 2 is a transverse, vertical sectional view, partly broken away, corresponding substantially to the line 2—2 of Figure 3. Figure 3 is a horizontal sectional view, corresponding substantially to the irregular line 3—3 of Figure 1. Only Figure 4 is a top plan view of Figure 1. Figure 5 is a broken, horizontal sectional view of the housing, corresponding substantially to the line 5 of Figure 1. Figure 6 is an elevational view of the control lever, partly broken away. Figure 7 is an elevational view looking from left to right in Figure 6. Figure 8 is an elevational view, looking from right to left in Figure 6, as indicated by the line 8—8. Figure 9 is an elevational view of the front arm member of the carrier for the intermediate pinion members, looking upwardly in Figure 3. Figure 10 is a top plan view of Figure 9. Only Figure 11 is an edge elevational view of Figure 9, looking from right to left in said figure. Figure 12 is an elevational view of the rear arm member of the carrier for the intermediate pinion members, looking downwardly in Figure 3.

The improved brake mechanism is preferably enclosed in a housing 10, which is secured to the vertical end wall of a railway car. The housing 10 comprises a rear section formed by a flat, vertical, platelike member or wall 11, provided with continuous top, bottom and side walls 12, 13, and 14, which extend outwardly from the wall 11. The housing 10 is closed by a cover plate 15 secured to the walls 12, 13, and 14 of said housing.

The housing 10 has an opening 16 in the bottom wall 13 thereof to accommodate the brake chain 17, which is connected to the operating parts of the brake mechanism proper, not shown, of the railway car.

The brake chain 17 is windable on the usual rotary drum 18, which is mounted within the housing 10.

Our improved mechanism comprises broadly a gear wheel A fixed to the chain winding drum 18 and rotatable in unison therewith, a rotary operating shaft B actuated by the hand wheel of the brakes, a pinion C fixed to the shaft B, a shiftable swinging carrier D, a shaft E journaled in said carrier, a pinion F fixed to the shaft E and meshing with the pinion C, a second pinion G fixed to the shaft E, a rotary shaft H journaled in the housing, a pinion J fixed to the shaft H and meshing with the gear wheel A and the pinion G, a second pinion K on the shaft H meshing with the pinion F, a spring pressed pawl L cooperating with the pinion G, a cam lever M swingingly supported by the housing, and a cam head P actuated by the lever M for shifting the carrier D.

The shaft B to which the pinion C is fixed has its rear end journaled in a bearing member 19 on the wall 11 of the housing. The front end portion of the shaft B extends through the cover plate 15 of the housing and is journaled in a bearing member on the inner side of said plate. The usual hand wheel, not shown, but indicated by the dotted line 20 in Figure 1, is fixed to the outer end of the shaft B, a portion of the hub 21 of the hand wheel being shown in Figure 3. The shaft H is located immediately above the gear wheel A and has its opposite ends journaled in bearing members 22—22 on the wall 11 and the cover plate 15 of the housing. The pinions J and K are fixed to the shaft H adjacent the rear and front ends thereof, the pinion J being in mesh with the teeth of the gear wheel A.

The shaft E, which has the pinions F and G fixed to the front and rear ends thereof, is supported by the carrier D, the pinion F being in transverse alignment with the pinions C and K and the pinion G being in transverse alignment with the pinion J, whereby, when the carrier D is in the depressed position shown in Figure 1, the pinion F is in mesh with the pinions C and K and the pinion G is in mesh with the pinion J, to transmit rotary motion from the hand wheel operated shaft B to the carrier D and the chain winding drum 18.

The carrier D, on which the shaft E is mounted, comprises a pair of arms 23 and 24 disposed at opposite sides of a supporting bracket 25 projecting inwardly from the right hand wall 14 of the housing, as seen in Figure 1, and being connected at their inner ends to said bracket by a pivot pin 26 on which these arms are swingingly supported. Each arm 23 and 24 is downwardly curved at its outer end, as clearly shown in Figures 1, 2, 9, and 12. The shaft E is connected to the outer ends of the arms 23 and 24, being journaled in aligned bearing openings 125—126 at said outer ends. As shown in Figure 3, the pinions F and G are located on the shaft E at points outwardly beyond the sides of the arms 23 and 24. The arm 23 has a laterally inwardly projecting, horizontal flange 27 at its upper edge between the ends of said arm, and the arm 24 has a similar flange 28 projecting laterally inwardly therefrom.

The cam lever M has its inner end provided with a cam head 29, which is slotted at one side, as indicated at 30, to engage over the outer end portion of the supporting bracket 25. The cam head end of the lever M is swingingly supported on the bracket 25 by a pivot pin 31, extending through said bracket and into aligned openings 32—32 in the slotted portion of said head 29. The flanges 27 and 28 of the arms 23 and 24 of the carrier D are supported upon the cam head 29, as shown in Figures 1 and 2, and when the lever M is thrown from the position shown in Figure 1 to that shown in Figure 2, the head 29 cams the carrier D upwardly through engagement with said flanges to lift the pinions F and G out of engagement with the pinions K and J, and also to disengage the pinion F from the pinion C. The lever M projects upwardly from the housing, extending through an opening 33 in the top wall 12 of said housing.

The pawl L, which cooperates with the pinion G, is pivotally supported at its inner end by means of a pin 34 extending through said pawl and fixed in a hub member 35 projecting from the outer side of the arm 24 of the carrier D. At the outer end, the pawl L is provided with a tooth 36 which engages with the teeth of the pinion G. The pawl L is yieldingly held in ratcheting engagement with the pinion G by a spring 37 interposed between the top side of the pawl and a depending boss 38 on the top wall 12 of the housing. The boss 38 is preferably provided with a projecting centering pin 39 extending into the upper end of the spring. The lower end of the spring 37 is held centered by being engaged in a seat 40 provided in the top side of the pawl.

The operation of our improved hand brake mechanism is as follows: Assuming that the parts are in the normal positions shown in Figure 1, that is, with the pinions F and G engaged with the pinions C, K, and J, upon rotation of the shaft B in chain winding direction, that is, in the direction of the arrow shown in Figure 1, the pinions K and J will be rotated through the medium of the pinions F and G, thereby imparting rotation to the gear A and the drum 18 in chain winding direction to tighten the brakes. During this action, retrograde movement of the chain winding drum is prevented by the spring pressed pawl L which is in ratcheting engagement with the teeth of the pinion G. To release the brakes, the lever M is through to the right from the position shown in Figure 1 to the position shown in Figure 2, thus camming the carrier D upwardly to lift the pinions F and G out of engagement with the pinions C, K, and J, thereby permitting free rotation of the drum 18 in chain unwinding direction without any rotary movement of the hand wheel. To restore the brake mechanism to operative position, the lever M is thrown back to the position shown in Figure 1, thereby reengaging the pinions F and G with the pinions K, C, and J.

We claim:

1. In a hand brake mechanism, the combination with a rotatable chain winding drum; of a rotatably mounted pinion; means operatively connecting the pinion with said drum for rotating the latter; a rotatable operating shaft; a pinion fixed to said shaft; a shiftable carrier movable toward and away from said pinions; a pinion rotatably supported on said carrier; and means for actuating said carrier to move said last named pinion into and out of engagement with said first and second named pinions.

2. In a hand brake mechanism, the combination with a rotatable chain winding drum; of a rotatably mounted pinion; means operatively connecting the pinion with said drum for rotating the latter; a rotatable operating shaft; a pinion fixed to said shaft; a shiftable carrier movable toward and away from said pinions; a pinion rotatably supported on said carrier; and lever actuated cam means for shifting said carrier to move said last named pinion into and out of engagement with said first and second named pinions.

3. In a hand brake mechanism, the combination with a rotatable chain winding drum; of a rotatably mounted pinion; means operatively connecting said pinion with said drum for rotating the latter; a rotatable operating shaft; a second pinion, said second pinion being fixed to said shaft; a swinging carrier pivoted at its inner end and having its outer end swingable toward and away from said first and second named pinions; a third pinion, said third pinion being rotatably journaled on the outer end of said carrier; and a lever actuated cam having engagement with said carrier to swing the same on its pivot to move said third named pinion into and out of engagement with said first and second named pinions.

4. In a hand brake mechanism, the combination with a rotatable chain winding drum; of a rotatably mounted pinion; means operatively connecting said pinion with said drum for rotating the latter; a rotatable operating shaft; a second pinion, said second pinion being fixed to said shaft; a swinging carrier pivotally supported at its inner end; a third pinion, said third pinion being rotatably supported on said carrier at the outer end thereof; and a rotary cam member engaging said carrier for swinging the same on its pivot to engage said third named pinion with and disengage the same from said first and second named pinions.

5. In a hand brake mechanism, the combination with a rotatable chain winding drum; of a rotatably mounted pinion; means operatively connecting the pinion with said drum for rotating the latter; a rotatable operating shaft; a pinion fixed to said shaft; a shiftable carrier movable toward and away from said pinions; a pinion rotatably supported on said carrier; means for actuating said carrier to move said last named pinion into and out of engagement with said first and second named pinions; and ratchet means for preventing retrograde rotation of said third named pinion.

6. In a hand brake mechanism, the combination with a rotatable chain winding drum; of a rotatably mounted pinion; means operatively connecting the pinion with said drum for rotating the latter; a rotatable operating shaft; a pinion fixed to said shaft; a shiftable carrier movable toward and away from said pinions; a pinion rotatably supported on said carrier; lever actuated cam means for shifting said carrier to move said last named pinion into and out of engagement with said first and second named pinions; a tooth wheel rotatable in unison with said third named pinion; and a spring pressed pawl engaging said wheel to hold the same against retrograde movement.

7. In a hand brake mechanism, the combination with a rotatable chain winding drum; of a rotatably mounted pinion; means operatively connecting said pinion with said drum for rotating the latter; a rotatable operating shaft; a second pinion, said second pinion being fixed to said shaft; a swinging carrier pivoted at its inner end and having its outer end swingable toward and away from said first and second named pinions; a third pinion, said third pinion being rotatably journaled on the outer end of said carrier; a lever actuated cam having engagement with said carrier to swing the same on its pivote to move said third named pinion into and out of engagement with said first and second named pinions; and ratchet means for holding said third named pinion against retrograde movement.

8. In a hand brake mechanism, the combination with a rotatable chain winding drum; of a gear fixed to said drum; a pinion meshing with said gear; a second pinion connected to said first named pinion for rotation in unison therewith; a rotary operating shaft; a third pinion, said third pinion being fixed to said shaft; a fourth pinion; a shiftable carrier swingably supported at its inner end, said fourth pinion being rotatably supported on the outer end of said carrier; and a lever operated cam engaging said carrier to swing the same on its pivot and engage said fourth named pinion with and disengage the same from said second and third named pinions.

9. In a band brake mechanism, the combination with a rotatable chain winding drum; of a gear fixed to said drum; a pinion meshing with said gear; a second pinion connected to said first named pinion for rotation in unison therewith; a rotary operating shaft; a third pinion, said third pinion being fixed to said shaft; a fourth pinion; a shiftable carrier swingingly supported at its inner end, and said fourth pinion being rotatably supported on the outer end of said carrier; a tooth wheel operatively connected with said fourth named pinion for rotation in unison therewith; a spring pressed pawl in ratcheting engagement with said wheel; and a lever operated cam engaging said carrier to swing the same on its pivot and engage said fourth named pinion with and disengage the same from said second and third named pinions.

10. In a hand brake mechanism, the combination with a rotatable chain winding drum; of a gear fixed to said drum; a pinion meshing with said gear; a second pinion; a rotary shaft to which said first and second named pinions are fixed; a rotary operating shaft; a third pinion, said third pinion being fixed to said operating shaft; a carrier swingingly supported at its inner end; a rotary shaft journaled in the outer end of said carrier; a fourth pinion; a fifth pinion, said fourth and fifth pinions being fixed a opposite ends of said last named shaft; and a lever actuated cam member engaging said carrier to swing the same inwardly and outwardly to engage said fourth pinion with and disengage the same from said first named pinion, and engage said fifth named pinion with and disengage the same from said second and third named pinions.

11. In a hand brake mechanism, the combination with a rotatable chain winding drum; of a gear fixed to said drum; a pinion meshing with said gear; a second pinion; a rotary shaft to which said first and second named pinions are fixed; a rotary operating shaft; a third pinion, said third pinion being fixed to said operating shaft; a carrier swingingly supported at its inner end; a rotary shaft journaled in the outer end of said carrier; a fourth pinion; a fifth pinion, said fourth and fifth pinions being fixed to opposite ends of said last named shaft; a lever actuated cam member engaging said carrier to swing the same inwardly and outwardly to engage said fourth pinion with and disengage the same from said first named pinion, and engage said fifth named pinion with and disengage the same from said second and third named pinions; and a spring pressed locking pawl pivotally mounted on said carrier and having ratcheting engagement with said fourth named pinion.

LEONARD A. MARQUARDT.
CHARLES E. GORTON.

No references cited.